United States Patent [19]

Meibuhr

[11] 3,859,181

[45] Jan. 7, 1975

[54] STABILIZATION OF NICKEL BORIDE CATALYST IN POTASSIUM HYDROXIDE ELECTROLYTES

[75] Inventor: Stuart G. Meibuhr, Birmingham, Mich.

[73] Assignee: General Motors Corporation, Detroit, Mich.

[22] Filed: Oct. 31, 1973

[21] Appl. No.: 411,221

Related U.S. Application Data

[63] Continuation-in-part of Ser. No. 291,587, Sept. 25, 1972, abandoned.

[52] U.S. Cl. ............... 204/16, 136/29, 136/120 FC
[51] Int. Cl. ..................... C23b 7/00, H01m 43/04
[58] Field of Search ............... 204/16, 37 R, 38 R; 136/120 FC, 29; 252/432

[56] References Cited
UNITED STATES PATENTS

| | | |
|---|---|---|
| 3,470,030 | 9/1969 | Lindholm .................... 136/120 FC |
| 3,479,228 | 11/1969 | Foucry ....................... 136/120 FC |
| 3,513,028 | 5/1970 | Salamon ..................... 136/120 FC |
| 3,525,702 | 8/1970 | Von Sturm ........................ 252/472 |

*Primary Examiner*—T. M. Tufariello
*Attorney, Agent, or Firm*—Lawrence Plant

[57] ABSTRACT

This invention relates to hydrazine fuel cell electrodes employing nickel boride as a catalyst and used with aqueous potassium hydroxide electrolytes. More particularly, this invention relates to contacting the nickel boride with a hydrogen atmosphere for a time and temperature sufficient to retard degradation of its effectiveness upon continued exposure to aqueous potassium hydroxide and to thereby extend the useful life of electrodes made therefrom.

3 Claims, 2 Drawing Figures

POTENTIAL TIME PLOTS FOR
VARIOUSLY TREATED $Ni_2B$ ANODES
A. UNTREATED $Ni_2B$ ANODES
B. $O_2$ TREATED (93°C)
C. $H_2$ TREATED (93°C)

POTENTIAL TIME PLOTS FOR
VARIOUSLY TREATED Ni$_2$B ANODES
A. UNTREATED Ni$_2$B ANODES
B. O$_2$ TREATED (93°C)
C. H$_2$ TREATED (93°C)

STABILIZATION OF NICKEL BORIDE CATALYST IN POTASSIUM HYDROXIDE ELECTROLYTES

This is a continuation-in-part of U.S. patent application Ser. No. 291,587, filed Sept. 25, 1972 in the name of Stuart G. Meibuhr, now abandoned and assigned to the assignee of this application.

BACKGROUND OF THE INVENTION

Nickel boride has been proposed as a catalyst for a number of fuel cell reactions carried out in aqueous potassium hydroxide electrolytes. In this regard, the nickel boride catalyst is useful at an anode to promote the oxidation of a number of fuels including hydrogen, hydrazine, hydrazine derivatives (e.g., monomethylhydrazine), etc. Nickel boride has also been suggested as being useful at cathodes used with air or oxygen. The nickel boride can be formed, compacted, and sintered into a self-supporting electrode or used as a packed-bed electrode or suspended in the electrolyte and contacted only occasionally with an auxiliary electrode or, as is usually the case, it is supported on a separate electrically conductive member made from a high surface area, low resistivity material which is inert to the potassium hydroxide electrolyte. The precise shape or structure of the support varies according to the nature of the reactant used with it. In this regard, gaseous (e.g., hydrogen or oxygen) reactants have different structural requirements than liquid reactants. Examples of gas electrode supports includes reticulated metal foam, wire meshes, felts of sintered metal fibers, porous carbon, and sintered carbon-Teflon as are known to those skilled in the art. The sintered carbon-Teflon type are described in more detail in U.S. Pat. No. 3,779,812, issued Dec. 18, 1973 in the name of Romeo R. Witherspoon entitled "Hydrophilic Treatment of Fuel Cell Electrodes" and assigned to the assignee of the present invention. An example of an electrode support useful with a liquid fuel (i.e., hydrazine) is an impervious metal foil having a plurality of nickel boride anchorage sites firmly bonded to its surface. One such electrode has electrolytic nickel bonded carbonyl nickel particles as the anchorage sites and is described in U.S. patent application Ser. No. 272,309, filed July 17, 1972, now patent No. 3,772,086, in the names of Stuart G. Meibuhr, et al., entitled "Method of Making Anodes for Hydrazine Fuel Cells" and assigned to the assignee of the present invention. The appropriate portions of the aforesaid patent applications are intended to be herein incorporated by reference.

Nickel boride has been applied to the supports in a number of ways including wetting the support with a solution of a nickel salt and subsequently immersing the wetted support in a solution of an alkali metal borohydride to chemically form the nickel boride in situ on the support. Another technique comprises spreading a pre-formed nickel boride paste onto/into the support by troweling or the like. Still another technique involves impregnating the support with a solution of soluble nickel boride salts, drying it and then heating it to decompose the soluble salts and form the nickel boride catalyst.

The Problem

Nickel boride catalyzed electrodes in continuous contact with aqueous potassium hydroxide solutions are usually short-lived in terms of their usefulness as hydrazine electrodes. In this regard, hydrazine electrodes made therefrom polarize with time until finally the available potential from the electrode falls below a practicable value. This is apparently so because unlike the hydrogen electrode, the potential of the $N_2H_4$ anode, when it is under load, is a function of the boron content in the catalyst and that boron content is continually reduced on contact with the electrolyte by the boron leaching out of the catalyst and into the electrolyte. It has been observed that this leaching-out occurs at about the same rate as the performance of the electrode decays. Degradation of the catalyst is manifested by an increase in the IR-free polarization of the electrode as measured against a standard Hg/HgO reference electrode using a modified Kordesch-Marko interrupter to correct for solution IR-drop. Boron concentration in the electrolyte is determined by chemical analysis. Boron loss to the electrolyte is directly proportional to contact time therebetween and is apparently independent of anodic current density. The boron loss rate to 33% KOH electrolytes from freshly prepared $Ni_2B$, for example, was measured at about 0.018 micrograms per hour.

BRIEF DESCRIPTION OF THE INVENTION

It is therefore an object of the present invention to stabilize a nickel boride catalyst to the extent of substantially reducing its degradation rate and thereby reducing the rate at which a nickel-boride-catalyzed hydrazine electrode's performance decays (dv/dt).

This and other objects of this invention will become more apparent from the detailed description which follows.

This invention comprehends stabilizing nickel boride catalyst for use in hydrazine fueled fuel cells, and involves contacting the nickel boride with a hydrogen atmosphere for a sufficient time to significantly reduce the rate at which a nickel boride catalyzed hydrazine electrode will polarize and its potential will decay to a non-practicably useful voltage upon continued contact with aqueous potassium hydroxide electrolytes. The atmosphere may comprise pure hydrogen or dilute mixtures thereof in inert carriers such as argon, nitrogen, etc., with the latter (i.e., dilute) being preferred. High hydrogen concentrations and temperatures will result in shorter treatment times and conversely, low hydrogen concentrations and temperatures will result in longer treatment times. Treatments with 6% $H_2$ in argon for about 1 hour at about 90° – 100°C are most preferred. Treatment temperatures in excess of about 150°C produce longer living electrodes than heretofore known, but one series of tests indicates that such electrodes are life limited to about 500 hours of electrochemical activity against a cut-off voltage of −0.95 volts. Other tests (see FIG. 2) have shown that 500 hours is not necessarily a maximum life limit for the higher temperature treatments, but confirms the lower temperature (i.e., about 100°C) treatments are about twice as effective as the higher temperature ones in terms of electrode life. The hydrogen treatment is most conveniently carried out after the nickel boride has been deposited on the support. However, some supports are temperature sensitive and for such supports it may be desirable to treat the nickel boride before it is applied to the support if a high temperature $H_2$ treatment is to be used.

DISCUSSION AND PREFERRED EMBODIMENTS

Figure 2:
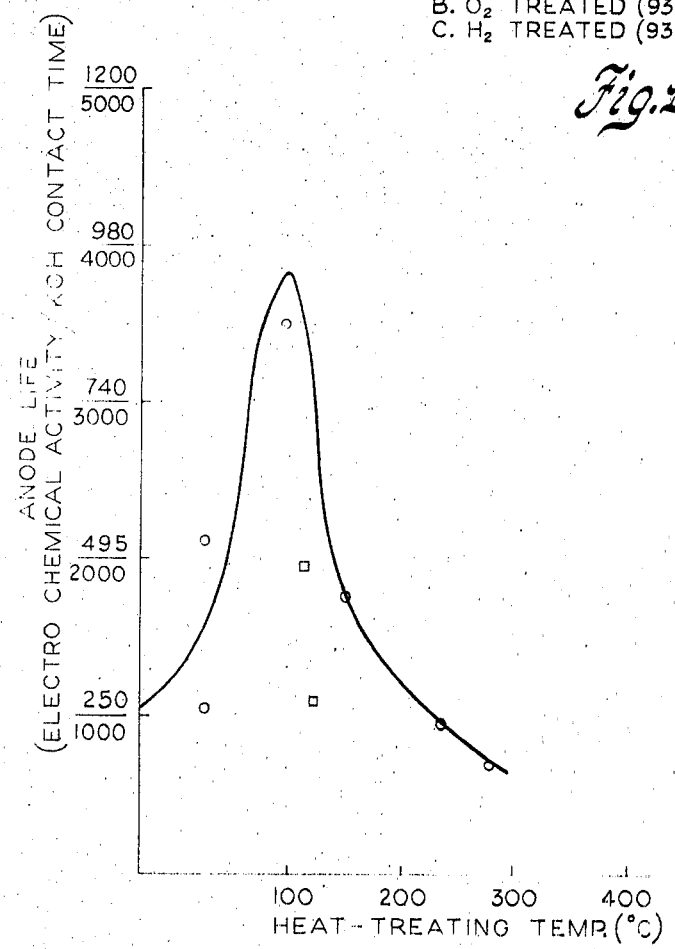
FIG. 2 is a graph depicting the effects of treatment temperature on electrode life.

In a very successful form of the invention, the nickel boride is contacted at about 93°C for about 1 hour in a stream of gas comprising 6 percent by volume hydrogen and the balance argon (see peak of FIG. 2). Treatment times and temperatures will vary as the concentrations of the hydrogen varies.

The precise mechanism whereby electrode life is improved is not understood. One possibility is that the hydrogen treatment somehow removes boron from the lattice of the catalyst leaving a more active nickel boride having a lower non-stoichiometric amount of boron in the catalyst and no interfering residue of boron byproducts to impede its effectiveness.

Observations were made using hydrazine anodes catalyzed with nickel boride but not exposed to hydrogen and with anodes which were heat treated in the presence of oxygen as disclosed in aforementioned U.S. patent application Ser. No. 291,584. All anodes tested exhibited a time decay in performance as measured by the IR-free potential against a Hg/HgO reference electrode. Examination of the electrode surfaces of the $O_2$ and non-heat treated samples taken before and after the electrochemical tests as well as periodic chemical analysis of the electrolyte used in the test showed that there was a loss of material from the anode and a corresponding increase in the concentration of boron in the potassium hydroxide. The rate of loss from the electrode substantially coincided with the rate of decay of the anode potential. The samples which were $O_2$ heat-treated according to the process of Ser. No. 291,584 exhibited a decay rate (dv/dt) in electrode potential which was substantially less than the untreated samples. In this regard, untreated hydrazine anodes exhibited decay rates of about 0.32 mV/hr and hydrazine anodes $O_2$ heat-treated according to the process of Ser. No. 291,584 had operating lives in which their reference potentials were more negative than −0.95 volts for periods averaging about 2½ times longer than untreated anodes (i.e., a decay rate of about 0.12 mV/hr). In contrast, hydrazine anodes treated for 1 hour at 93°C in a 6 percent hydrogen-in-argon atmosphere according to this invention have lasted more than 5 times the $O_2$-treated samples under the same conditions. Tests have shown that such $H_2$-treated hydrazine electrodes exhibit decay rates of about 0.014 mV/hr. More specifically, a number of tests were conducted using a nickel boride catalyzed hydrazine anode of the type disclosed in the aforesaid United States patent application Ser. No. 272,309. Some were untreated, others were modified by the $O_2$ heat treatment of Ser. No. 291,584, and still others $H_2$-treated as above. Generally speaking, when operating at a current density of 200 milliamperes per square centimeter ($ma/cm^2$), untreated electrodes decayed to an arbitrary cut-off voltage of −0.95 volts in about 60 hours of electrochemical operating time and 220 hours of KOH contact time. Occasionally, some of these electrodes lasted as much as 80 hours of operating time and 300 hours of contact time. On the average the $O_2$ heat-treated anodes sustained about 160 hours of electrochemical activity and 600 hours of KOH contact time while anodes $H_2$-treated as above have functioned well above −0.95 volts for over 700 hours of electrochemical activity and about 2,800 hours of KOH contact time. Other similar $H_2$-treated electrodes have sustained about 920 hours of electrochemical activity and 3,800 hours of KOH contact time.

To illustrate the invention, dimpled nickel foils (0.05 mm thick) were electroformed on a chromium-plated, stainless steel mandrel from an 18 liter nickel sulfamate and nickel chloride bath comprising 300 grams per liter nickel sulfamate, 6 grams per liter nickel chloride and 30 grams per liter boric acid (pH 2.3 - 4.0). The geometric area of the dimpled foil was about 48 $cm^2$ though due to the dimples the actual surface was larger. Carbonyl nickel particles (International Nickel Co.) were then electrolytically co-deposited with electrolytic nickel onto the electroformed foils using a vertical half-box arrangement with the foils at the bottom and using 500 ml of the aforesaid nickel sulfamate electroforming solution and 500 milligrams of carbonyl nickel. A nickel anode screen was spaced above the foil to provide an electrode gap of about 62 mm. A potential was established between the foil and the screen and the nickel bath poured into the cell. A stirrer was energized (i.e., 7,100 rpm) and the carbonyl nickel (International Nickel Mond 255) added. Stirring continued for 1 minute and then stopped. Plating continued for about 9 minutes after stirring stopped for a total of about 10 minutes total plating time at a current density of about 0.04 amps/$cm^2$ of the support's geometrical area. In general, an acceptable plating range for the electrolytic deposition of the electrolytic and carbonyl nickel is about 5 to 24 total coulombs per square centimeter of support.

Nickel boride catalyst was chemically formed in and on the carbonyl nickel by first dipping the support into a 5 percent aqueous solution of nickel acetate for about 15 seconds, draining and then dipping it into an aqueous 10 percent solution of sodium borohydride for about 30 seconds and rinsing. This procedure was repeated three times or until about 3 mg/$cm^2$ of nickel boride was formed. After drying, the $O_2$-treated anodes were placed in a pre-heated tube furnace modified to operate over the desired temperature range and to accept flowing air. The air flow was 1½ liters per minute which was begun immediately and continued for the duration of the heat treatment. The heat treatment itself lasted 1 hour at a temperature of 93°C. The still-warm anodes were removed from the furnace and placed immediately into the test cells. The anodes $H_2$-treated according to this invention were first placed in the cold tube and the $H_2$-argon (6%-$H_2$) gas flowed through the tube at a rate of 1.5 liter/min for 1 hour to purge it of all oxygen. With the gas still flowing, the tube was placed in the oven, heated to 93°C, and held there for 1 hour. The tube was cooled with the $H_2$-atmosphere maintained. The anodes were quickly assembled into the test cells during which time they were exposed to the air.

The test anodes were operated at a constant current density of 200 milliamperes per square centimeter ($ma/cm^2$) for about 2 hours before the initial IR-free polarization data were taken. The test temperature was about 31°C using about 300 cc of a 33% KOH electrolyte containing 3.2 percent hydrazine as the anolyte and flowing it over the anode at a rate of about 100 ml/min. At this flow rate, the fuel concentration was about 16 times the stoichiometric amount. The catholyte was 33% KOH and perforated stainless steel was used as the counter electrode at which hydrogen was evolved during testing. The anolyte and catholyte were sepaprated by a microporous membrane material known as Acropor AN 200 (acrylonitrile polyvinylchloride copolymer reinforced with nylon) sold by the Gelman Instrument Company. Polarization data were made daily and the anode was operated at 200 ma/cm$^2$ between polarization runs. Boron concentrations were measured at the conclusion of several electrochemical tests. The tests were terminated when the IR-free anode-reference potential (Hg/HgO) fell to −0.95 volts. A modified Kordesch-Marko interrupter was used to correct for electrolyte IR-drop. The anodes were capable of operating for longer times at potential values below −0.95 volts, but this value was selected as the "cut-off" potential for evaluation purposes.

Figure 1:
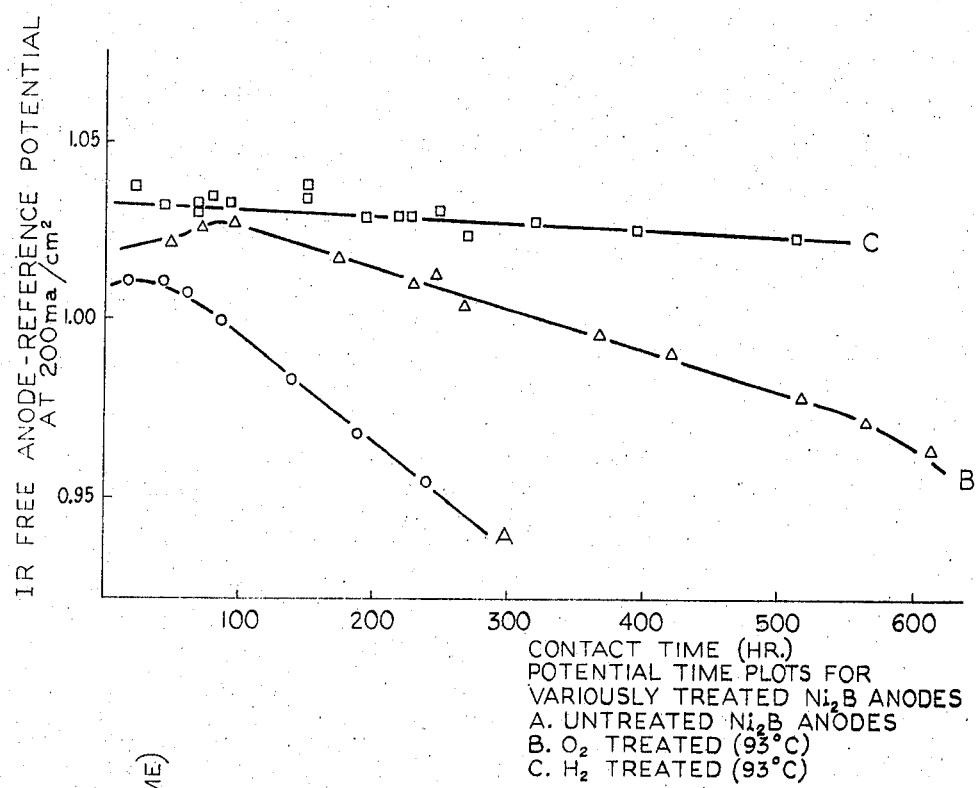
FIG. 1 is a graph comparing the catalyst treated according to this invention to other nickel boride catalysts.

The untreated nickel boride anodes exhibited a time dependence in the anode potential as depicted by Curve A in FIG. 1. The time scale represents the number of hours of contact time between the anode and the KOH electrolyte. The anodes were operated electrochemically at 200 milliamperes per square centimeter for about one-fourth of the contact time. On the average, the untreated anodes could be expected to perform at potentials above the arbitrary cut-off voltage of −0.95 volts for about 60 hours of electrochemical usage and about 220 hours of KOH contact time.

The nickel boride anodes heat treated in dry air as described above performed significantly better as shown by Curve B. In contrast to both of these, anodes treated in hydrogen, as above, continued to perform at a level more negative than the cut-off value of −0.95 volts after 700 hours operating time and 2,800 hours contact time and performed according to Curve of FIG. 1 in the early stages of the test. From these data it is seen that the H$_2$-treated anodes have a decay rate (dv/dt) magnitude less than freshly catalyzed, untreated, nickel boride catalysts under the same usage conditions.

Still other tests were conducted to demonstrate the effects of temperature on the treatment and the results of these tests are shown in FIG. 2. For these tests a ribbed, rather than dimpled, substrate was used to yield catalyzed and heat treated anodes having an active area of about 48 cm$^2$. The heat treatment procedure was the same as set forth above with the 6% H$_2$ in argon gas except that these electrodes were cooled in flowing argon rather than the H$_2$-argon treating gas. The electrodes were operated in a cell against an Ni-plated, perforated steel sheet at a constant current density of 200 milliamps/cm$^2$. A 31°C electrolyte (5.7M[33%]KOH containing 1M[3.2%] N$_2$H$_4$) flowed through the test cell at about 16 times stoichiometric for this current density. The anode potentials were measured against the Hg/HgO reference electrode.

The curve of FIG. 2 shows that for a 6% H$_2$-argon treatment, gas temperatures around 100°C appear optimum for treatment times around 1 hour which other tests indicate is optimum for this concentration. Electrodes cooled in the presence of the 6% H$_2$ demonstrated long lives but not as long as those cooled in argon. Electrodes cooled in 100% H$_2$ had still shorter lives. Everything considered, i.e., treatment time, temperature and H$_2$ concentration, the evidence suggests that some boron should be removed from the surface of the catalyst to obtain reduced decay rates and long useful lives and that these benefits can be lost by not removing enough or removing too much boron.

While I have disclosed my invention primarily in terms of specific embodiments thereof, I do not intend to be limited thereto except to the extent hereinafter set forth in the claims which follow.

I claim:

1. A method for treating fine particles of nickel boride catalyst for promoting the electrochemical oxidation of hydrazine in the presence of an aqueous potassium hydroxide electrolyte comprising contacting said nickel boride at a temperature of about 90°C to about 100°C with an atmosphere consisting essentially of hydrogen for a time sufficient to retard the performance decay rate (dv/dt) and increase the useful life of the catalyst on continued contact with the electrolyte.

2. In a method of making a hydrazine fuel cell electrode for use in an aqueous potassium hydroxide electrolyte including the principal step of depositing fine particles of nickel boride catalyst on an electrically conductive support, the improvement comprising contacting said catalyst at a temperature of less than about 150°C with an atmosphere consisting essentially of hydrogen for less than about 1 hour but sufficient to retard the performance decay rate (dv/dt) and increase the useful life of the electrode on continued contact with the electrolyte.

3. In the method of making a hydrazine anode for use in an aqueous potassium hydroxide electrolyte fuel cell including the principal step of depositing fine particles of nickel boride catalyst on an electrically conductive support, the improvement comprising contacting the catalyzed support for about 1 hour with an atmosphere consisting essentially of hydrogen in an inert gas and at a temperature of about 93°C to retard the performance decay rate (dv/dt) and increase the useful life of the electrode on continued contact with the electrolyte.

* * * * *